US009714826B2

(12) United States Patent
Higo et al.

(10) Patent No.: US 9,714,826 B2
(45) Date of Patent: Jul. 25, 2017

(54) MEASUREMENT APPARATUS AND METHOD THEREOF

(71) Applicant: CANON KABUSHIKI KAISHA, Tokyo (JP)

(72) Inventors: Tomoaki Higo, Tokyo (JP); Toshihiro Kobayashi, Tokyo (JP); Masayoshi Yamasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/734,559

(22) Filed: Jun. 9, 2015

(65) Prior Publication Data
US 2015/0362312 A1 Dec. 17, 2015

(30) Foreign Application Priority Data
Jun. 13, 2014 (JP) ................................ 2014-122744

(51) Int. Cl.
G01B 11/24 (2006.01)
G01B 11/25 (2006.01)
G06T 7/586 (2017.01)

(52) U.S. Cl.
CPC .......... G01B 11/2513 (2013.01); G06T 7/586 (2017.01)

(58) Field of Classification Search
CPC .... G01B 11/25; G01B 11/2513; G06T 7/0073
USPC ................................ 356/600–640
See application file for complete search history.

(56) References Cited

U.S. PATENT DOCUMENTS 6,369,899 B1* 4/2002 Hamada ............. A61F 9/00804
356/497
2007/0177160 A1* 8/2007 Sasaki .................. G06T 7/0051
356/603

FOREIGN PATENT DOCUMENTS

JP 2006-275529 A 10/2006
JP 2008-281399 A 11/2008

OTHER PUBLICATIONS

Nayar et al., "Fast Separation of Direct and Global Components of a Scene using High Frequency Illumination", ACM Transactions on Graphics (TOG)—Proceedings of ACM SIGGRAPH 2006, vol. 25 Issue 3, Jul. 2006, pp. 935-944.
Furuse et al., "More Accurate 3D Scanning Method by Controlling Subsurface Scattering", MIRU2008 Meeting on Image Recognition and Understanding, Jul. 2008, pp. 840-845.

* cited by examiner

*Primary Examiner* — Tri T Ton
(74) *Attorney, Agent, or Firm* — Carter, DeLuca, Farrell & Schmidt, LLP

(57) ABSTRACT

A shape of an object is measured using a plurality of space encoding patterns each of which includes a light portion and a dark portion. A first and second pattern sets are obtained. The first set comprises patterns each of which has the light portion of each space encoding pattern masked by a pattern mask. The second set comprises patterns each of which has the light portion of each of the space encoding pattern masked by a mask with varying the mask pattern. Captured images of an object on which the patterns of the first and second sets are sequentially projected are inputted. A correspondence between projection coordinates of the projected pattern and image coordinates of a captured image for the projected pattern is detected. A shape of the object is derived based on correspondences.

13 Claims, 7 Drawing Sheets

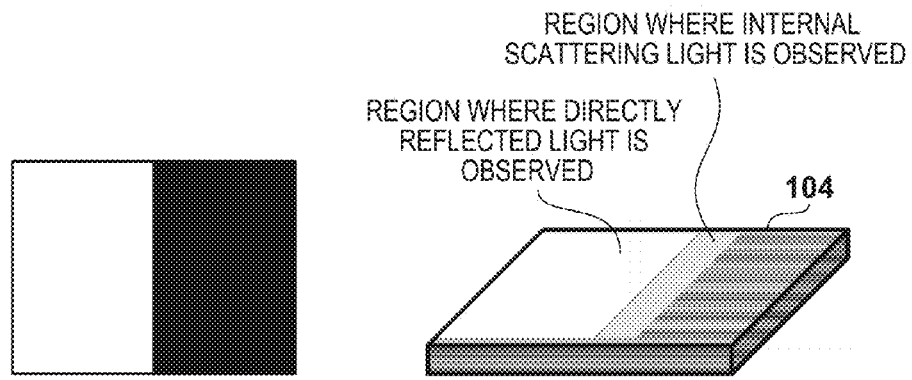
FIG. 4A          FIG. 4B
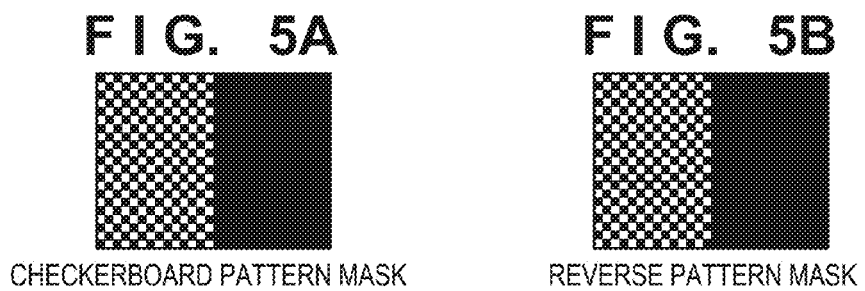
FIG. 5A          FIG. 5B
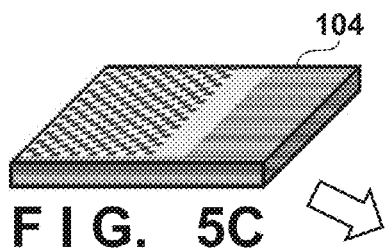 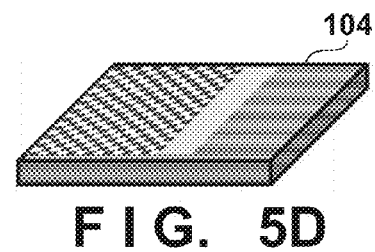
FIG. 5C          FIG. 5D
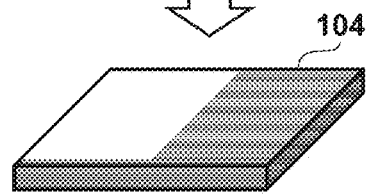
FIG. 5E

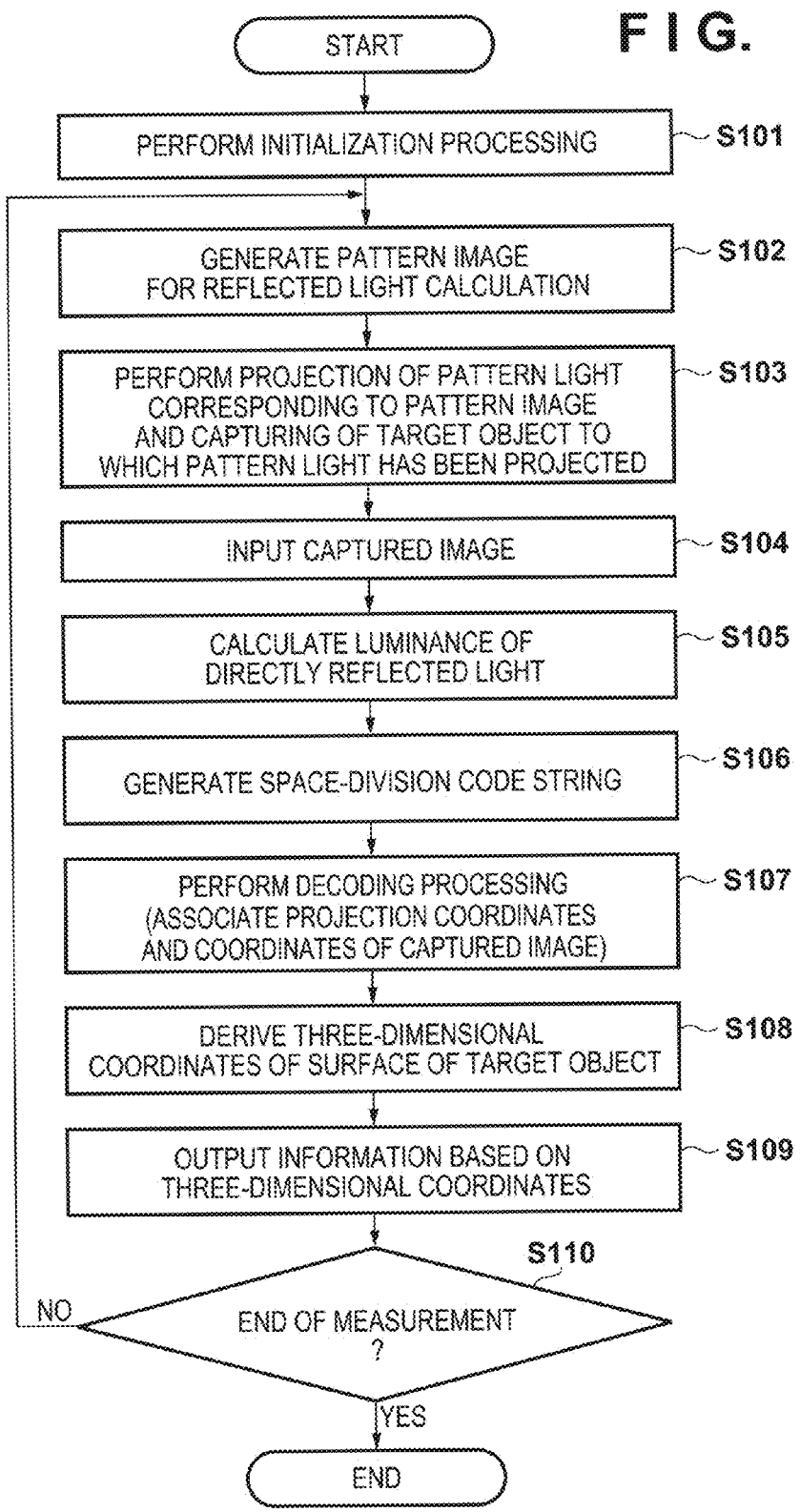

US 9,714,826 B2

MEASUREMENT APPARATUS AND METHOD THEREOF

BACKGROUND OF THE INVENTION

Field of the Invention

The present invention relates to measurement of the three-dimensional shape of an object to be measured.

Description of the Related Art

There is known a three-dimensional measurement apparatus that projects a slit pattern typified by a space encoding method from a projection unit such as a projector to an object to be measured (to be referred to as a "target object" hereinafter), and obtains the three-dimensional coordinates of the target object by the principle of triangulation based on a position at which an image capturing unit has observed the reflected light. One problem with measurement by this apparatus is that the measurement accuracy of three-dimensional coordinates greatly depends on the material of a target object.

For a target object made of a material such as plastic, the measurement accuracy may degrade or measurement itself may become impossible owing to a phenomenon called subsurface scattering or internal scattering. Such a target object needs to undergo a treatment of, for example, coating in advance the surface of the target object with a white powder or the like. This becomes an obstacle that greatly limits the scope of application of three-dimensional measurement apparatuses.

As a method of avoiding observation of internal scattering, Japanese Patent Laid-Open No. 2008-281399 (Reference 1) discloses a method in which a linear polarization plate is arranged in an optical path to separate surface reflected light and internal scattering light, and the three-dimensional shape of a target object including a semitransparent portion is accurately measured.

As a method of suppressing the effect of internal scattering, Reference 2 proposes a three-dimensional shape measurement method of modulating slit light by a maximum length sequence (MLS) including a high-frequency component to reduce the effect of internal scattering.

Reference 2: Tatsuhiko Furuse, Shinsaku Hiura, Kosuke Sato, "More Accurate 3D Scanning Method by Controlling Subsurface Scattering", MIRU2008 Meeting on Image Recognition and Understanding Japanese Patent Laid-Open No. 2006-275529 (Reference 3) discloses a method of preventing the effect, on a peripheral target object, of inter-reflection caused by secondary reflection between objects when projecting a phase shift pattern to three-dimensionally measure a plurality of target objects, though this method is not a countermeasure against the effect of internal scattering. More specifically, Reference 3 discloses a method of performing three-dimensional measurement while avoiding secondary reflection from an adjacent object using a checkerboard pattern mask.

However, the method in Reference 1 separates surface reflected light and internal scattering light using polarized light, so the geometrical relationship between the light source, the light receiving portion, and the measurement target surface needs to satisfy a predetermined condition. It is not always easy to satisfy this condition and perform measurement.

Since the method in Reference 2 modulates a gray code by MLS, for example, as many as 31 types of patterns need to be projected to each bit of the gray code, greatly prolonging the measurement time.

The method of performing three-dimensional measurement using the checkerboard pattern mask in Reference 3 suppresses only the effect of inter-reflection from a non-projection region adjacent to a projection region in the checkerboard pattern. Although this method is effective for an ideal target object for which an inter-reflection generating portion can be limited, it cannot cope with more common inter-reflection, or internal scattering that affects a region near the incident position of incident light on a non-measurement target.

SUMMARY OF THE INVENTION

In one aspect, a measurement apparatus for measuring a three-dimensional shape of an object using a plurality of space encoding patterns each of which includes a light portion and a dark portion, the apparatus comprising: an obtaining unit configured to obtain a first pattern set comprising patterns each of which has the light portion of each space encoding pattern masked by a predetermined pattern mask, and a second pattern set comprising patterns each of which has the light portion of each of the space encoding pattern masked by a mask with varying the predetermined pattern; an input unit configured to input, from a capturing device, captured images of an object to be measured on which the patterns of the first and second pattern sets are sequentially projected by a projection device; a detection unit configured to detect a correspondence between projection coordinates of the projected pattern and image coordinates of a captured image for the projected pattern; and a derivation unit configured to derive a three-dimensional shape of the object to be measured based on correspondences detected by the detection unit.

According to the aspect, the three-dimensional shape of an object to be measured can be measured by removing the effect of indirectly reflected light including internal scattering.

Further features of the present invention will become apparent from the following description of exemplary embodiments with reference to the attached drawings.

BRIEF DESCRIPTION OF THE DRAWINGS

FIGS. 4A and 4B are views for explaining the effect of internal scattering light.

FIGS. 5A to 5E are views for explaining a method of removing the effect of internal scattering light.

FIG. 6 is a flowchart for explaining measurement processing in the three-dimensional measurement apparatus.

DESCRIPTION OF THE EMBODIMENTS

A measurement apparatus, an information processing apparatus, a measurement method, and an information processing method according to each of embodiments of the present invention will now be described in detail with reference to the accompanying drawings. Note that an arrangement described in the following embodiment is merely an example, and the present invention is not limited to the illustrated arrangement.

First Embodiment

In the first embodiment, a pattern image set using a checkerboard pattern mask and a mask reverse to the checkerboard pattern is generated using a gray code as a pattern (to be referred to as a "space encoding pattern" hereinafter) that divides the measurement space and performs encoding. Then, the luminance of directly reflected light of an object to be measured (to be referred to as a "target object" hereinafter) upon projecting the pattern image set to the measurement space is calculated to generate a space-division code string and measure the three-dimensional shape of the target object. This method will be explained.

[Apparatus Arrangement]

Figure 1:
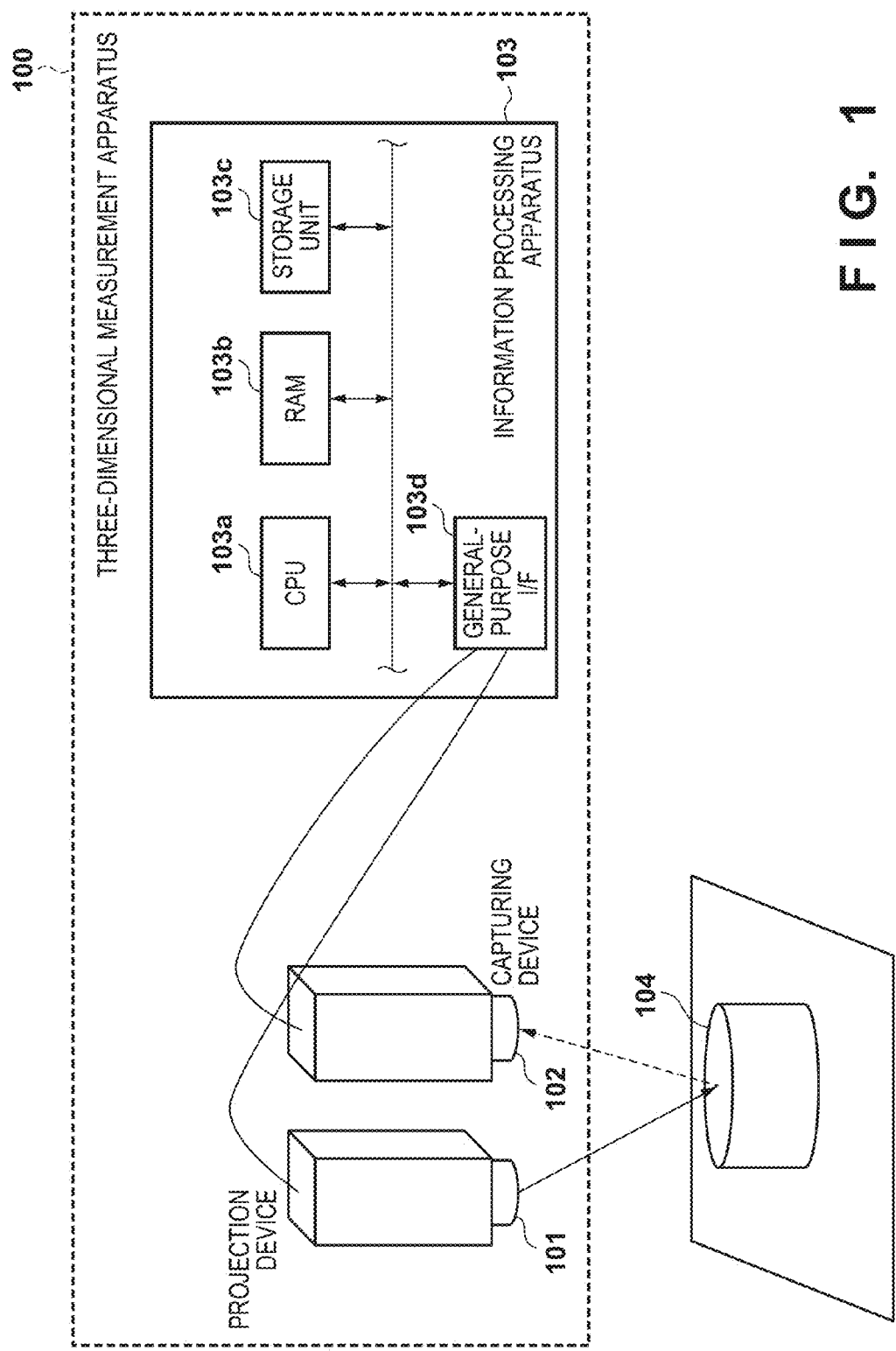
FIG. 1 is a block diagram showing the arrangement of a three-dimensional measurement apparatus according to an embodiment.

The arrangement of a three-dimensional measurement apparatus 100 according to the embodiment is shown in the block diagram of FIG. 1. A projection device 101 projects a pattern light image (to be described later) to a target object 104. The pattern light is reflected by the surface of the target object 104, and a capturing device 102 captures an image of the target object 104. The image captured by the capturing device 102 is sent to an information processing apparatus 103, and the information processing apparatus 103 calculates the three-dimensional coordinates of the target object 104. Also, the information processing apparatus 103 controls the operations of the projection device 101 and capturing device 102.

The information processing apparatus 103 is a computer device. A microprocessor (CPU) 103a of the information processing apparatus 103 executes a measurement processing program stored in a storage unit 103c serving as a nonvolatile memory using a random access memory (RAM) 103b as a work memory, and controls the operations of the projection device 101 and capturing device 102 through an interface (I/F) 103d, thereby implementing the function of the information processing apparatus 103 (to be described later).

Information Processing Apparatus

Figure 2:
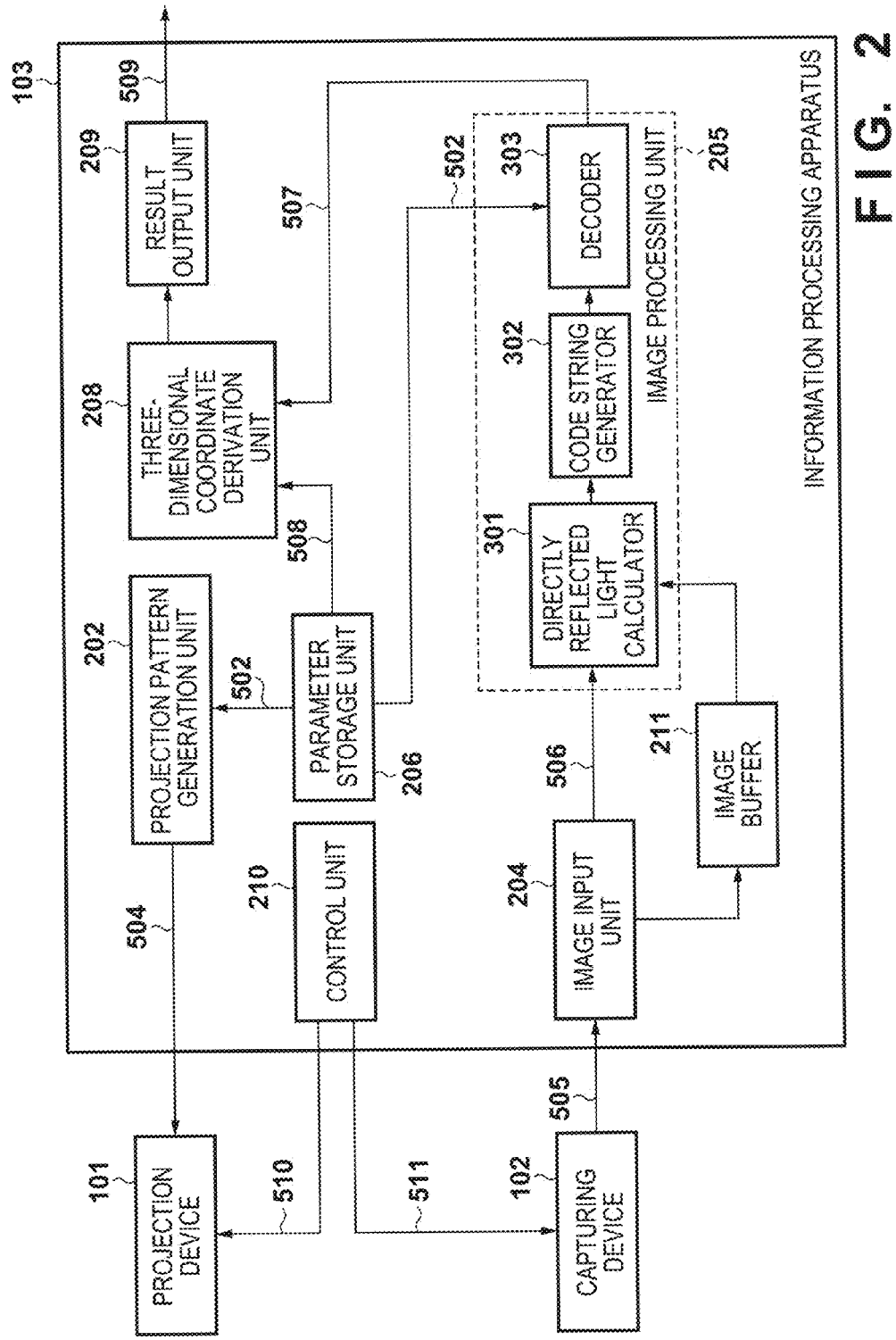
FIG. 2 is a block diagram for explaining the function of an information processing apparatus according to the embodiment.

The function of the information processing apparatus 103 according to the embodiment will be explained with reference to the block diagram of FIG. 2. The information processing apparatus 103 is a computer device, and the CPU 103a of the information processing apparatus 103 executes a program stored in the storage unit 103c using the RAM 103b as a work memory, thereby implementing the function shown in FIG. 2.

A control unit 210 controls the operation of each unit of the information processing apparatus 103 (to be described later), and controls the operations of the projection device 101 and capturing device 102. A parameter storage unit 206 is allocated to the RAM 103b, the storage unit 103c, or the like, and holds various parameters necessary for three-dimensional measurement. The parameters include settings for controlling the projection device 101 and the capturing device 102, calibration data 508, and the like.

A projection pattern generation unit 202 properly generates a pattern image 504 (to be described later) for reflected light calculation based on a space encoding pattern sequence 502 read out from the parameter storage unit 206. The projection pattern generation unit 202 outputs the pattern image 504 to the projection device 101. It is also possible to hold, in the parameter storage unit 206, the pattern image 504 generated by the projection pattern generation unit 202, and output the pattern image 504 acquired from the parameter storage unit 206 to the projection device 101.

The space encoding pattern sequence 502 is a set of patterns that can be projected by the projection device 101 to divide a measurement space including the target object 104 into a plurality of regions and perform encoding. The first embodiment uses a gray code for the space encoding pattern, and details of the pattern image 504 for reflected light calculation based on the gray code will be described later.

The projection device 101 projects pattern light based on the pattern image 504 to the target object 104. Note that projection of pattern light starts when the projection device 101 receives a projection control signal 510 output from the control unit 210. The capturing device 102 captures an image of the measurement space with capturing parameters (shutter speed, f-number, and object distance) set in advance upon receiving a capturing control signal 511 output from the control unit 210, and outputs a captured image 505.

An image input unit 204 receives the captured image 505 from the capturing device 102, and stores it in an image buffer 211 assigned to the RAM 103b or the like. Since a plurality of images of the target object 104 to which pattern beams of different pattern images 504 have been projected are captured, the image input unit 204 sequentially receives the captured images 505 from the capturing device 102 and adds the received captured images 505 to the image buffer 211. After captured images are acquired by a number necessary for one calculation of three-dimensional coordinates, the control unit 210 outputs, to an image processing unit 205, information 506 representing a captured image set held in the image buffer 211.

Upon receiving the information 506 representing a captured image set, the image processing unit 205 performs, on the captured image set, image processing necessary before calculation of three-dimensional coordinates. The image processing to be performed by the image processing unit 205 includes calculation of the luminance of directly reflected light and generation of a space-division code string.

In the image processing unit 205, a directly reflected light calculator 301 calculates the luminance of directly reflected light in an image based on the bright/dark portion of a captured image. A code string generator 302 generates a space-division code string based on the luminance of directly reflected light. A decoder 303 receives the space-division code string, and performs decoding processing based on the space encoding pattern sequence 502 stored in the parameter storage unit 206. More specifically, the decoder 303 performs association between the projection coordinates of the space encoding pattern sequence 502 and the coordinates of a captured image, and outputs, to a three-dimensional coordinate derivation unit 208, coordinate information 507 representing the correspondence between the projection coordinates and the coordinates of the captured image.

The three-dimensional coordinate derivation unit 208 derives three-dimensional coordinates 509 of the surface of the target object 104 from the coordinate information 507 by referring to the calibration data 508 of the projection device 101 and capturing device 102 that is stored in the parameter storage unit 206. A result output unit 209 outputs information based on the three-dimensional coordinates 509 derived by the three-dimensional coordinate derivation unit 208. The result output unit 209 is an interface for USB (Universal Serial Bus), HDMI® (High-Definition Multimedia Interface), or a wired or wireless network. The output destination of the three-dimensional coordinates 509 is, for example, a monitor, another computer, a server apparatus, an auxiliary storage device, or various recording media. Information output from the result output unit 209 is, for example, a coordinate value represented by the three-dimensional coordinates 509, or the three-dimensional image of the target object 104 based on the three-dimensional coordinates 509.

[Space Encoding]

FIGS. 3A to 3F show pattern sets for reflected light calculation. The pattern sets shown in FIGS. 3A to 3F are generated by masking using a checkerboard pattern mask, and a mask of a pattern reverse (to be referred to as a "reverse pattern" hereinafter) to the checkerboard pattern for each of gray code patterns serving as space encoding patterns.

Figure 3A:
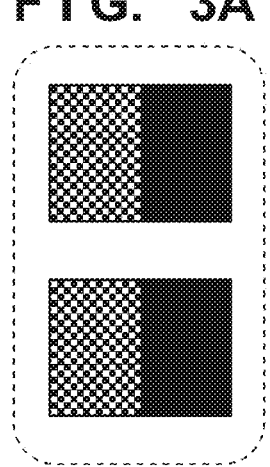
FIGS. 3A to 3F are views showing pattern sets for reflected light calculation.
Figure 3B:
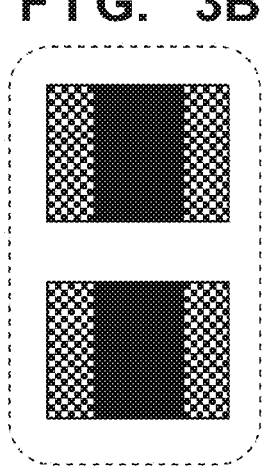
Figure 3C:
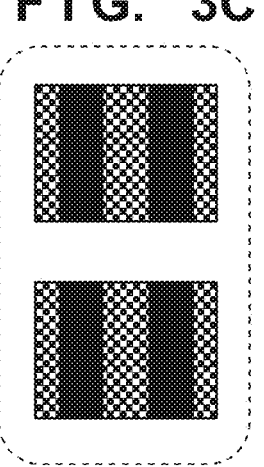

FIG. 3A shows a pattern (upper stage) obtained by applying the checkerboard pattern mask to the bright portion of a lowest-frequency gray code pattern configured to project light to only the left half of the projectable range, and a pattern (lower stage) obtained by applying the reverse pattern mask to the bright portion of the same gray code pattern. The two gray code patterns shown in FIG. 3A form one pattern set for reflected light calculation. As shown in FIGS. 3B and 3C, pattern sets for reflected light calculation are generated similarly for gray code patterns of other frequencies.

Figure 3D:
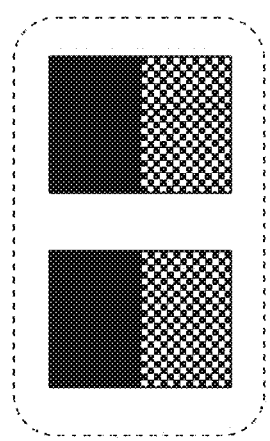
Figure 3E:
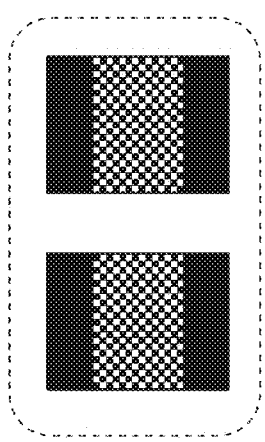
Figure 3F:
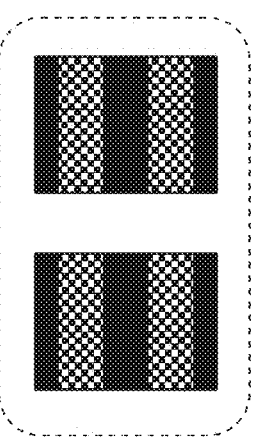

In a general space encoding method, a normal pattern image and in addition a reverse pattern image are used to suppress the effect of the reflectance of the target object 104 and stably read a combination of bright and dark portions in a captured image. FIGS. 3D to 3F show pattern sets (to be referred to as "reverse pattern sets" hereinafter) corresponding to pattern sets (to be referred to as "reference pattern sets" hereinafter) for reflected light calculation shown in FIGS. 3A to 3C. Each reverse pattern of the reverse pattern set is not a pattern directly reverse to the bright and dark portions of a corresponding reference pattern, but is a pattern obtained by reversing the bright and dark portions of a gray code without reversing the bright and dark portions of a mask.

Reflected light components are calculated from captured images obtained by projecting the pattern sets for reflected light calculation shown in FIGS. 3A to 3F and capturing images. Then, bright/dark determination is performed to generate a space-division code string. If the space encoding pattern sequence 502 is a gray code, a code string expressed by a binary number such as '1010' is formed by arranging the pixel of a bright portion in a captured image as '1' and the pixel of a dark portion as '0' in the pattern projection order. The measurement space is encoded based on the space encoding pattern of the gray code, and the correspondence between projection coordinates and coordinates of the captured image is obtained. Accordingly, the three-dimensional shape of the target object 104 can be obtained by triangulation.

[Effect of Internal Scattering Light]

The effect of internal scattering light will be explained with reference to FIGS. 4A and 4B. When the target object 104 is semitransparent, if the lowest-frequency gray code pattern (FIG. 4A) is projected to the target object 104, not only a directly reflected light component but also the effect of internal scattering light is observed, as shown in FIG. 4B. When a space-division code string is obtained from a captured image obtained by capturing a scene as shown in FIG. 4B, internal scattering light is observed in a region that should be originally determined as a dark portion. As a result, the region that should be originally determined as a dark portion is determined as a bright portion, an erroneous space-division code string is formed, and no correct three-dimensional coordinates are obtained.

A method of removing the effect of internal scattering light will be explained with reference to FIGS. 5A to 5E. FIG. 5A shows the reference pattern of a checkerboard pattern mask, and FIG. 5B shows an example of the reference pattern of a reverse pattern mask. When these reference patterns are projected to the target object 104, the effect of internal scattering light is observed in the right region of the target object 104 where no light has been projected, as shown in FIGS. 5C and 5D. Further, in the left region of the target object 104 where the checkerboard pattern has been projected, not only directly reflected light, but also light to which internal scattering light is added is observed.

In FIG. 5C, a luminance value Iai of a pixel i corresponding to a bright portion of the checkerboard pattern in the left region of the target object 104 where the checkerboard pattern is projected is defined by:

$$Iai = Idi + Igi \quad (1)$$

where Idi is the luminance based on directly reflected light in the pixel i; and Igi is the luminance based on indirectly reflected light generated by internal scattering, inter-reflection, or the like.

In FIG. 5D, the pixel i at the same position corresponds to a dark portion of the checkerboard pattern. A luminance value Ibi of the pixel i is decided by only indirectly reflected light:

$$Ibi = Igi \quad (2)$$

Note that the condition to regard the luminance Igi based on indirectly reflected light as the same in equations (1) and (2) is that the lattice size of the checkerboard pattern is much smaller than the range of the effect of indirectly reflected light. A method of deciding the lattice size of the checkerboard pattern will be described later. If the lattice size condition is satisfied, the effect of indirectly reflected light including internal scattering light can be removed to calculate the luminance Idi based on directly reflected light:

$$Idi = |Iai - Ibi| \quad (3)$$

In a pixel j of the right region of the target object 104 where no light is projected, a luminance Igj based on indirectly reflected light is observed for both a luminance Iaj corresponding to FIG. 5C and a luminance Ibj corresponding to FIG. 5C. Hence, Iaj−Ibj is calculated, obtaining a value close to 0.

Let Iai be the luminance value of the pixel i at the bright portion of the checkerboard pattern, and Ibi be the luminance value of the pixel i at the dark portion of the checkerboard pattern. Then, the directly reflected light calculator 301 solves equation (3) to calculate the luminance Idi based on directly reflected light, as shown in FIG. 5E.

[Lattice Size]

Next, a method of adaptively deciding the lattice size of the checkerboard pattern in accordance with the target object 104 will be explained. As described above, to remove the effect of indirectly reflected light, the lattice size of the checkerboard pattern needs to be sufficiently small. However, if the lattice size is too small, the intensity of directly reflected light decreases, the difference between the directly reflected light component and indirectly reflected light component of a signal decreases, and accurate detection of the directly reflected light component may become difficult.

Thus, before performing three-dimensional measurement, a pair of the reference pattern of the checkerboard pattern and the reference pattern of the reverse pattern is projected to the target object 104 to capture images. Then, a difference absolute value |Iai−Ibi| in each pixel between the two captured images is calculated. This processing starts from a checkerboard pattern having a small lattice size. The lattice size is gradually increased, and the processing is repeated until the lattice size exceeds a value at which |Iai−Ibi| is not regarded as noise. If the lattice size reaches a value or larger at which |Iai−Ibi| is not regarded as noise, this lattice size is decided as a lattice size used when performing three-dimensional measurement. In other words, the lattice size of the checkerboard pattern is set to be a size at which the difference absolute value |Iai−Ibi| is not regarded as noise.

For example, when the projection device 101 projects a pattern of 1,024×768 pixels to a region of 40×30 cm, the reference size of the lattice is 4×4 pixels (about 1.5×1.5 mm). However, since an appropriate lattice size changes depending on the reflection characteristic and internal scattering characteristic of the target object 104, the lattice size is decided for each target object 104 according to the above-described method.

[Generation of Space-Division Code String]

A method of generating a space-division code string will be explained next. To suppress the effect of the reflectance of the target object 104, luminances of directly reflected light are calculated by the above-mentioned |Iai−Ibi| processing from images obtained by capturing the reference pattern sets shown in FIGS. 3A to 3C and the reverse pattern sets shown in FIGS. 3D to 3F. Then, a code b is decided from:

if ($I0i-I1i>0$)

$bi=$ '1';

else $bi=$ '0';                                             (4)

where bi is the code corresponding to the pixel i;

I0i is the luminance value of directly reflected light in the pixel i in the reference pattern; and I1i is the luminance value of directly reflected light in the pixel i in the reverse pattern.

The code string generator 302 performs the above-described processing for the entire space encoding pattern sequence 502, generating a space-division code string (for example, '1010 . . . ') by arranging in order the codes bi obtained for the respective pixels.

[Measurement Processing]

Measurement processing in the three-dimensional measurement apparatus 100 will be explained with reference to the flowchart of FIG. 6. When the three-dimensional measurement apparatus 100 is activated, the control unit 210 performs initialization processing (S101). In the initialization processing, the control unit 210 activates the projection device 101 and the capturing device 102. Further, the control unit 210 sets, in the three-dimensional coordinate derivation unit 208, the calibration data 508 stored in the parameter storage unit 206, and sets, in the projection pattern generation unit 202, the space encoding pattern sequence 502 stored in the parameter storage unit 206. That is, setting processing of various parameters is performed.

Then, the control unit 210 controls the projection pattern generation unit 202 to generate the pattern image 504 for reflected light calculation from the space encoding pattern sequence 502 according to the above-described procedures, and output the pattern image 504 to the projection device 101 (S102).

The control unit 210 controls the projection device 101 to project, to the target object 104, pattern light corresponding to the pattern image 504, and almost simultaneously controls the capturing device 102 to capture an image of the target object 104 to which the pattern light has been projected (S103). The control unit 210 holds the captured image 505 in the image buffer 211 through the image input unit 204 (S104).

In step S103, projection and capturing of the reference pattern of a checkerboard pattern mask, projection and capturing of the reference pattern of a reverse pattern mask, projection and capturing of the reverse pattern of a checkerboard pattern mask, and projection and capturing of the reverse pattern of a reverse pattern mask are sequentially performed. Steps S103 and S104 are repetitively performed till the completion of projection and capturing of the pattern image 504 by a number necessary to calculate three-dimensional coordinates.

After acquiring the necessary number of captured images 505, the control unit 210 controls the image processing unit 205 to calculate the luminance of directly reflected light in accordance with equation (3) from the captured image 505 capturing a state in which the pattern image 504 for reflected light calculation has been projected to the target object 104 (S105). The control unit 210 generates a space-division code string in accordance with conditional expression (4) based on the calculated luminance of directly reflected light (S106). The control unit 210 performs decoding processing of the space encoding pattern sequence 502 to associate projection coordinates and coordinates of the captured image (S107).

After that, the control unit 210 controls the three-dimensional coordinate derivation unit 208 to derive the three-dimensional coordinates 509 of the surface of the target object 104 from the correspondence between the projection coordinates and the coordinates of the captured image serving as the decoding result (S108). The control unit 210 controls the result output unit 209 to output information based on the three-dimensional coordinates 509 (S109). The processes in steps S103 to S109 need not be executed in an order complying with the order of this explanation. As for processes including no dependence, the execution order may be appropriately changed, or these processes can also be performed simultaneously.

After the end of calculating the three-dimensional coordinates (measuring the three-dimensional shape) of the surface of the target object 104, the control unit 210 determines a user instruction (S110). In accordance with the user instruction, the control unit 210 returns the process to step S102 to continue the measurement processing, or ends the measurement processing.

As described above, a pattern image capable of calculating the luminance of directly reflected light is projected to the target object 104 as a space encoding pattern, and the luminance of directly reflected light of the target object 104 is calculated. A space-division code string is generated based on the luminance of directly reflected light, and the three-dimensional shape of the target object 104 is measured. By removing the indirectly reflected light component such as internal scattering, an error when generating a space-division code string can be prevented to stably and accurately calculate the three-dimensional coordinates of the target object 104.

According to the first embodiment, even when the target object 104 includes a semitransparent portion that causes internal scattering, measurement of an accurate three-dimensional shape becomes possible. That is, when a pattern image is projected to the target object 104 including a semitransparent portion, the effect of internal scattering or inter-reflection can be suppressed to stably perform high-accuracy three-dimensional measurement.

Second Embodiment

A measurement apparatus, an information processing apparatus, a measurement method, and an information processing method according to the second embodiment of the present invention will be described below. In the second embodiment, the same reference numerals as those in the first embodiment denote the same parts, and a detailed description thereof will not be repeated.

The second embodiment will explain a method in which a phase shift method is used as a space encoding pattern, the luminance of directly reflected light of a target object 104 is calculated based on a pattern set using a checkerboard pattern mask and reverse pattern mask, then a space-division code string is generated, and measurement of the three-dimensional shape of the target object 104 is performed.

The second embodiment is different from the first embodiment in a pattern image 504 that is generated by a projection pattern generation unit 202, and a method of associating projection coordinates and coordinates of a captured image in an image processing unit 205. The phase shift method is a method of calculating the phases of sine waves in respective pixels from the luminance values of a plurality of captured images obtained by projecting a pattern (to be referred to as a "sinusoidal pattern" hereinafter) in which the luminance value changes sinusoidally, while shifting the phase, and associating projection coordinates and coordinates of the captured images.

Figure 7A:
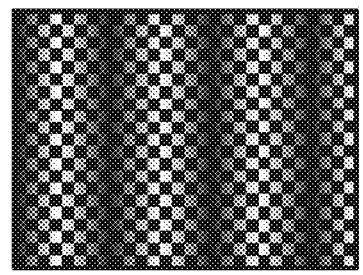
FIGS. 7A and 7B are views showing an example of a reference pattern set according to the second embodiment.
Figure 7B:
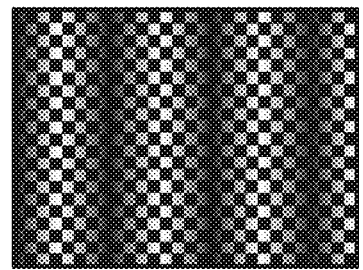

The projection pattern generation unit 202 according to the second embodiment applies a checkerboard pattern mask and a reverse pattern mask to each sinusoidal pattern using a phase shift pattern as a space encoding pattern sequence 502, thereby generating the pattern image 504 for reflected light calculation. FIGS. 7A and 7B show an example of a reference pattern set according to the second embodiment. FIG. 7A shows a reference pattern to which a checkerboard pattern mask is applied. FIG. 7B shows a reference pattern to which a reverse pattern mask is applied.

The image processing unit 205 calculates the luminance of directly reflected light in each pixel by calculating a difference absolute value $|Iai-Ibi|$ from captured images obtained by projecting the pattern images 504 corresponding to the reference patterns shown in FIGS. 7A and 7B, as in the first embodiment. The image processing unit 205 calculates the phase of a sine wave in each pixel based on the luminance of directly reflected light, as in a general phase shift method, and associates projection coordinates and coordinates of the captured image.

In this manner, when the phase shift method is used, an accurate luminance value is requested of a captured pattern image. Even in this case, stable and accurate three-dimensional measurement can be performed by calculating the luminance of directly reflected light.

Modification of Embodiments

Figure 8A:
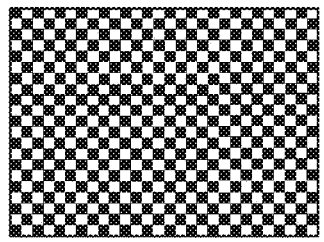
FIGS. 8A to 8C are views for explaining an example of a mask pattern.

An example of a mask pattern will be explained with reference to FIGS. 8A to 8C. The first and second embodiments have explained examples in which the pattern image 504 is generated using a mask pattern of a checkerboard pattern as shown in FIG. 8A and a mask pattern of the reverse pattern. Instead of the mask pattern of the checkerboard pattern shown in FIG. 8A, a mask pattern of a lattice pattern as shown in FIG. 8B may also be used, or a mosaic pattern formed from a high-frequency pattern may also be used.

Figure 8B:
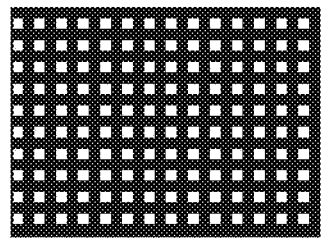
Figure 8C:

For example, when the mask pattern shown in FIG. 8B is used, a pattern in which light is projected to one of four squares shown in FIG. 8C is repeated. Therefore, it suffices to generate a pattern set for reflected light calculation by grouping at least four masks into one set so that light is projected at least once to regions corresponding to the respective squares.

The luminance of directly reflected light when the mask pattern shown in FIG. 8B is used is calculated by subtracting the minimum luminance value of a pixel i from the maximum luminance value:

$$Idi=\max(Iki)-\min(Iki) \qquad (5)$$

where Iki is the luminance value in the pixel i of the kth (k=1, 2, 3, and 4) captured image;
max( ) is the function of outputting a maximum value; and
min( ) is the function of outputting a minimum value.

When indirectly reflected light exerts an effect on only a narrow range, if the lattice size of a lattice pattern mask is set to be n×n pixels, the mask position is moved by every m (≤n) pixels (predetermined distance). A plurality of masks for projecting light to the respective pixels at least once may be grouped into one set, generating a pattern set for reflected light calculation.

The number of projections of a pattern image changes depending on the mask moving amount (m pixels). As the m value is smaller, the performance of removal of the effect of indirectly reflected light is improved, but the number of projections increases, and the measurement time is prolonged. Therefore, the value of the mask moving amount m is desirably set to be a maximum value within a range in which indirectly reflected light can be removed.

Figure 9A:
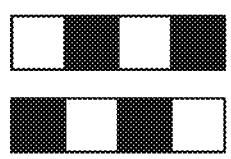
FIGS. 9A to 9C are views for explaining a method of adaptively deciding a mask moving amount with respect to a target object.
Figure 9B:
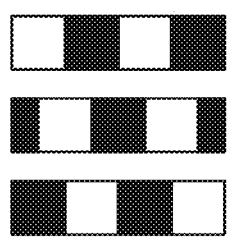
Figure 9C:
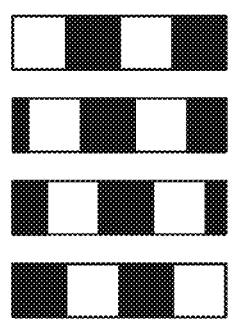

A method of adaptively deciding the mask moving amount m with respect to the target object 104 will be explained with reference to FIGS. 9A to 9C. Assume that n×n pixels, which is the lattice size of a lattice pattern mask, is decided to be 4×4 pixels according to the method described in the first embodiment or the like. FIG. 9A shows an example in which the mask position is moved by every n pixels (m=n). FIG. 9B shows an example in which the mask position is moved by every n/2 pixels (m=n/2). FIG. 9C shows an example in which the mask position is moved by every n/3 pixels (m=n/3). In FIGS. 9A to 9C, projection and capturing are required twice, three times, and four times in one direction, respectively.

Projection and capturing are performed by sequentially decreasing the moving amount m from the moving amount m=n in FIG. 9A. The moving amount m is decreased until it is determined that removal of the indirectly reflected light component is possible. For example, m=2 is set for n=4, and the pattern image 504 using a lattice pattern mask is generated.

As a method of determining whether an indirectly reflected light component can be removed, for example, the minimum luminance values of respective pixels are extracted from a captured image set obtained by moving the mask position, thereby forming an indirectly reflected light image. If no periodic lattice pattern remains in the indirectly reflected light image, it is determined that the indirectly reflected light component has been removed. In other words, the mask moving amount m is set so that the periodic pattern of a lattice pattern does not remain in an indirectly reflected light image formed from minimum luminance values.

When detection of the presence/absence of the periodic pattern is performed automatically, for example, a method is used, in which two-dimensional Fourier transform is performed on an indirectly reflected light image, and it is determined whether the peak of the luminance is observed at a frequency at which the lattice appears repetitively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122744 filed Jun. 13, 2014 which is hereby incorporated by reference herein in its entirety.

What is claimed is:

1. A measurement apparatus for measuring a three-dimensional shape of an object using a plurality of space encoding patterns each of which includes a light portion and a dark portion, the measurement apparatus comprising:
    one or more processors; and
    at least one memory coupled to the one or more processors, the at least one memory having instructions stored thereon which, when executed by the one or more processors cause the measurement apparatus to:
    obtain a first pattern set comprising patterns each of which has the light portion of each space encoding pattern masked by a checkerboard pattern mask, and a second pattern set comprising patterns each of which has the light portion of each of the space encoding pattern masked by a mask with varying the checkerboard pattern mask,
    input, from a capturing device, captured images of an object to be measured on which the patterns of the first and second pattern sets are sequentially projected by a projection device,
    detect a correspondence between projection coordinates of the projected pattern and image coordinates of a captured image for the projected pattern, and
    derive a three-dimensional shape of the object to be measured based on detected correspondences.

2. The measurement apparatus according to claim 1, wherein, in the light portion, each pattern of the first pattern set has a first light/dark pattern, and each pattern of the second pattern set has a second light/dark pattern reverse to the first light/dark pattern.

3. The measurement apparatus according to claim 1, wherein the at least one memory has further instructions stored thereon which, when executed by the one or more processors cause the measurement apparatus to:
    calculate an image representing directly reflected light, based on a captured image for a pattern of the first pattern set and a captured image for a corresponding pattern of the second pattern set,
    generate a space-division code string based on the image representing directly reflected light, and
    decode the correspondence based on the space-division code string and the plurality of space encoding patterns.

4. The measurement apparatus according to claim 3, wherein the at least one memory has further instructions stored thereon which, when executed by the one or more processors cause the measurement apparatus to calculate, in each pixel of the captured image, an absolute difference value between a luminance value corresponding to the light portion of the pattern and a luminance value corresponding to the dark portion of the corresponding pattern as a component of the directly reflected light.

5. The measurement apparatus according to claim 1, wherein the at least one memory has further instructions stored thereon which, when executed by the one or more processors cause the measurement apparatus to generate the first pattern set using the checkerboard pattern mask, and generate the second pattern set using a mask reverse to the checkerboard pattern mask.

6. The measurement apparatus according to claim 1, wherein a lattice size of the checkerboard pattern mask is set to a size that the absolute difference value is not regarded as noise.

7. The measurement apparatus according to claim 1, wherein the space encoding pattern comprises a phase shift pattern.

8. The measurement apparatus according to claim 1, wherein the at least one memory has further instructions stored thereon which, when executed by the one or more processors cause the measurement apparatus to obtain a third pattern set comprising patterns each of which has the light portion of each of reverse patterns masked by the checkerboard pattern mask, and a fourth pattern set comprising patterns each of which has the light portion of each reverse pattern masked by the mask with varying the checkerboard pattern mask, wherein the reverse patterns are obtained by reversing the plurality of space encoding patterns, and input, from the capturing device, captured images of the object to be measured on which the patterns of the third and fourth pattern sets are sequentially projected by the projection device.

9. The measurement apparatus according to claim 1, wherein in the plurality of space encoding patterns, at least one of a light portion width or a dark portion width is different from each other.

10. A method of measuring a three-dimensional shape of an object using a plurality of space encoding patterns each of which includes a light portion and a dark portion, the method comprising:

using a processor to perform:
obtaining a first pattern set comprising patterns each of which has the light portion of each space encoding pattern masked by a checkerboard pattern mask, and a second pattern set comprising patterns each of which has the light portion of each of the space encoding pattern masked by a mask with varying the checkerboard pattern mask;
inputting, from a capturing device, captured images of an object to be measured on which the patterns of the first and second pattern sets are sequentially projected by a projection device;
detecting a correspondence between projection coordinates of the projected pattern and image coordinates of a captured image for the projected pattern; and
deriving a three-dimensional shape of the object to be measured based on correspondences detected in the detecting.

11. A non-transitory computer readable medium storing a computer-executable program for causing a computer to perform a method of measuring a three-dimensional shape of an object using a plurality of space encoding patterns each of which includes a light portion and a dark portion, the method comprising:

obtaining a first pattern set comprising patterns each of which has the light portion of each space encoding pattern masked by a checkerboard pattern mask, and a second pattern set comprising patterns each of which has the light portion of each of the space encoding pattern masked by a mask with varying the checkerboard pattern mask;
inputting, from a capturing device, captured images of an object to be measured on which the patterns of the first and second pattern sets are sequentially projected by a projection device;
detecting a correspondence between projection coordinates of the projected pattern and image coordinates of a captured image for the projected pattern; and
deriving a three-dimensional shape of the object to be measured based on correspondences detected in the detecting.

12. A measurement apparatus for measuring a three-dimensional shape of an object using a plurality of space encoding patterns each of which includes a light portion and a dark portion, the apparatus comprising:

one or more processors; and
at least one memory coupled to the one or more processors, the at least one memory having instructions stored thereon which, when executed by the one or more processors cause the measurement apparatus to:
obtain a first pattern set comprising patterns each of which has the light portion of each space encoding pattern masked by a predetermined pattern mask, and a second pattern set comprising patterns each of which has the light portion of each of the space encoding pattern masked by a mask with varying the predetermined pattern,
input, from a capturing device, captured images of an object to be measured on which the patterns of the first and second pattern sets are sequentially projected by a projection device,
detect a correspondence between projection coordinates of the projected pattern and image coordinates of a captured image for the projected pattern, and
derive a three-dimensional shape of the object to be measured based on correspondences detected,
wherein to detect, the at least one memory has further instructions stored thereon which, when executed by the one or more processors cause the measurement apparatus to:
calculate an image representing directly reflected light, based on a captured image for a pattern of the first pattern set and a captured image for a corresponding pattern of the second pattern set,
generate a space-division code string based on the image representing directly reflected light, and
decode the correspondence based on the space-division code string and the plurality of space encoding patterns.

13. A measurement apparatus for measuring a three-dimensional shape of an object using a plurality of space encoding patterns each of which includes a light portion and a dark portion, the apparatus comprising:

one or more processors; and
at least one memory coupled to the one or more processors, the at least one memory having instructions stored thereon which, when executed by the one or more processors cause the measurement apparatus to:
obtain a first pattern set comprising patterns each of which has the light portion of each space encoding pattern masked by a predetermined pattern mask, and a second pattern set comprising patterns each of which has the light portion of each of the space encoding pattern masked by a mask with varying the predetermined pattern mask,
input, from a capturing device, captured images of an object to be measured on which the patterns of the first and second pattern sets are sequentially projected by a projection device,
detect a correspondence between projection coordinates of the projected pattern and image coordinates of a captured image for the projected pattern, and
derive a three-dimensional shape of the object to be measured based on correspondences detected,
wherein to obtain, the at least one memory has further instructions stored thereon which, when executed by the one or more processors cause the measurement apparatus to obtain a third pattern set comprising patterns each of which has the light portion of each reverse pattern masked by the predetermined pattern mask, and a fourth pattern set comprising patterns each of which has the light portion of each reverse pattern masked by the mask with varying the predetermined pattern mask, wherein the reverse patterns are obtained by reversing the plurality of space encoding patterns, and
wherein to input, the at least one memory has further instructions stored thereon which, when executed by the one or more processors cause the measurement apparatus to input, from the capturing device, captured images of the object to be measured on which the patterns of the third and fourth pattern sets are sequentially projected by the projection device.

\* \* \* \* \*